US012748896B2

(12) United States Patent
La Rosa

(10) Patent No.: US 12,748,896 B2
(45) **Date of Patent: *Sep. 29, 2026**

(54) PHYSICAL UNCLONABLE FUNCTION DEVICE AND METHOD

(71) Applicant: STMicroelectronics (Rousset) SAS, Rousset (FR)

(72) Inventor: Francesco La Rosa, Rousset (FR)

(73) Assignee: STMICROELECTRONICS (ROUSSET) SAS, Rousset Cedex (FR)

( * ) Notice: Subject to any disclaimer, the term of this patent is extended or adjusted under 35 U.S.C. 154(b) by 152 days.

This patent is subject to a terminal disclaimer.

(21) Appl. No.: 18/661,060

(22) Filed: May 10, 2024

(65) Prior Publication Data

US 2024/0296253 A1 Sep. 5, 2024

Related U.S. Application Data

(63) Continuation of application No. 17/199,438, filed on Mar. 12, 2021, now Pat. No. 12,001,593.

(30) Foreign Application Priority Data

Mar. 25, 2020 (FR) ........................................ 2002929

(51) Int. Cl.
*G06F 21/75* (2013.01)
*G06F 21/72* (2013.01)
(Continued)

(52) U.S. Cl.
CPC .............. *G06F 21/75* (2013.01); *G06F 21/72* (2013.01); *G11C 11/4096* (2013.01); *H03K 19/17768* (2013.01); *H10D 84/84* (2025.01)

(58) Field of Classification Search
CPC ... G06F 21/75; G06F 21/72; H03K 19/17768; G11C 11/4096; H10D 84/84
(Continued)

(56) References Cited

U.S. PATENT DOCUMENTS 4,612,630 A * 9/1986 Rosier .................... G11C 5/145 365/201
5,293,328 A * 3/1994 Amin ................. G11C 16/0425 365/185.26
(Continued)

FOREIGN PATENT DOCUMENTS

CN 1339160 A 3/2002
CN 108630682 A 10/2018
(Continued)

OTHER PUBLICATIONS

Arunkumar Vijayakumar, "Physical Design Obfuscation of Hardware: A Comprehensive Investigation of Deviceand Logic-Level Techniques" IEEE, 2016 IEEE.*
(Continued)

*Primary Examiner* — Samson B Lemma
(74) *Attorney, Agent, or Firm* — Slater Matsil, LLP

(57) ABSTRACT

An embodiment system comprises a physical unclonable function device, wherein the device comprises a first assembly of non-volatile memory cells each having a selection transistor embedded in a semiconductor substrate and a depletion-type state transistor having a control gate and a floating gate that are electrically connected, the state transistors having respective effective threshold voltages belonging to a common random distribution, and a processing circuit configured to deliver, to an output interface of the device, a group of output data based on a reading of the effective threshold voltages of the state transistors of the memory cells of the first assembly.

20 Claims, 13 Drawing Sheets

(51) Int. Cl.
*G11C 11/4096* (2006.01)
*H03K 19/17768* (2020.01)
*H10D 84/84* (2025.01)

(58) Field of Classification Search
USPC .......................................................... 713/189
See application file for complete search history.

(56) References Cited

U.S. PATENT DOCUMENTS

| | | | | |
|---|---|---|---|---|
| 5,450,361 | A * | 9/1995 | Iwahashi ................ | G11C 16/28 365/210.11 |
| 6,577,530 | B2 * | 6/2003 | Muranaka ........... | G11C 11/5692 365/177 |
| 6,621,734 | B2 * | 9/2003 | Hamaguchi ............ | G11C 29/82 365/185.01 |
| 8,039,886 | B2 | 10/2011 | Mizukami et al. | |
| 9,385,871 | B2 * | 7/2016 | Kang .................... | G06F 21/445 |
| 9,966,954 | B1 * | 5/2018 | Yang ........................ | H03K 3/84 |
| 10,468,104 | B1 | 11/2019 | Anand et al. | |
| 11,139,022 | B1 * | 10/2021 | Tei ...................... | G11C 11/5642 |
| 11,556,657 | B2 | 1/2023 | Toyoshima et al. | |
| 2002/0006054 | A1 | 1/2002 | Shukuri et al. | |
| 2002/0071308 | A1 * | 6/2002 | Muranaka ........... | G11C 11/5692 257/E27.084 |
| 2002/0181280 | A1 * | 12/2002 | Hamaguchi ............ | G11C 29/82 365/185.09 |
| 2013/0228846 | A1 * | 9/2013 | La Rosa ................ | G11C 16/14 438/264 |
| 2017/0090873 | A1 | 3/2017 | Clark et al. | |
| 2017/0180140 | A1 * | 6/2017 | Mai ....................... | H04L 9/3278 |
| 2017/0200508 | A1 | 7/2017 | Grigoriev et al. | |
| 2017/0278577 | A1 | 9/2017 | La Rosa | |
| 2018/0277496 | A1 | 9/2018 | Lisart et al. | |
| 2019/0068383 | A1 * | 2/2019 | Wang ....................... | G11C 7/24 |
| 2019/0121556 | A1 | 4/2019 | Tran et al. | |
| 2019/0237141 | A1 | 8/2019 | La Rosa et al. | |
| 2019/0392179 | A1 | 12/2019 | Lu | |
| 2021/0303735 | A1 | 9/2021 | La Rosa | |

FOREIGN PATENT DOCUMENTS

| | | | |
|---|---|---|---|
| CN | 109427408 | A | 3/2019 |
| CN | 110085273 | A | 8/2019 |
| CN | 110598487 | A | 12/2019 |
| CN | 216053039 | U | 3/2022 |

OTHER PUBLICATIONS

Qinggui, Z., et al., “A Tutorial on IC Layout Design,” ISBN 978-7-5478-1036-1, Shanghai Science and Technology Press, Mar. 2012, 17 pages.

Longxing, Zhang, “Fundamentals of Electronic Technology, Second Edition,” ISBN 7-04-008147-4, Higher Education Press, Jul. 2000, 20 pages.

* cited by examiner

[Fig 1]
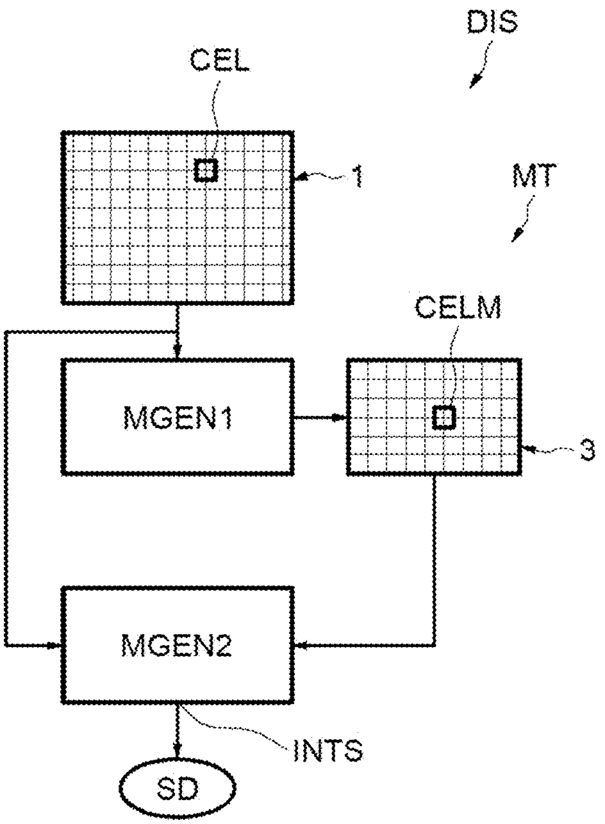

[Fig 2]
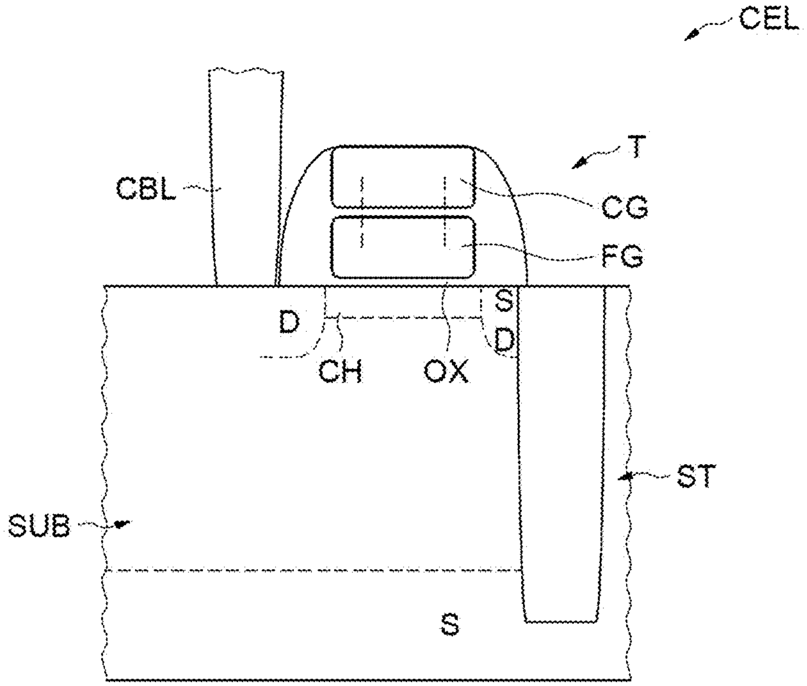

[Fig 3]
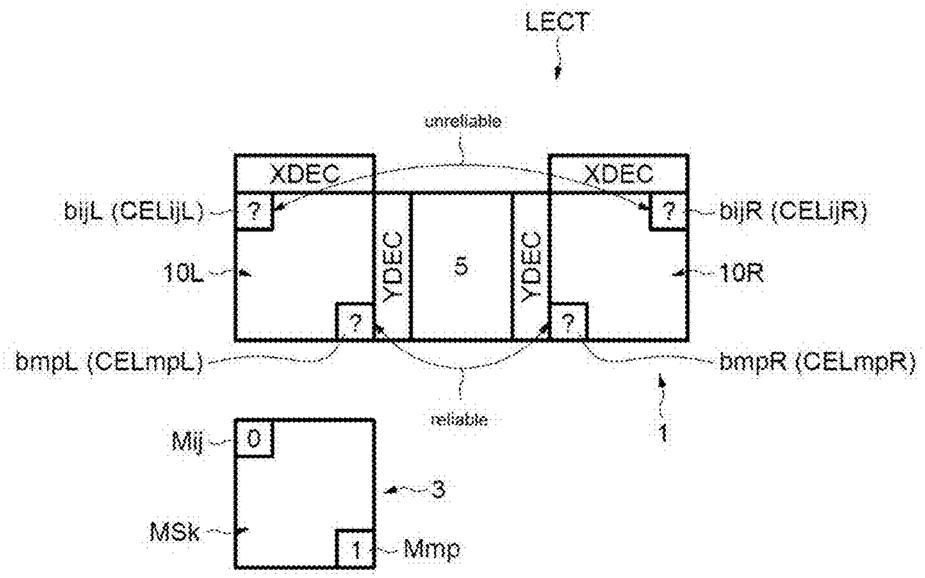

[Fig 4]
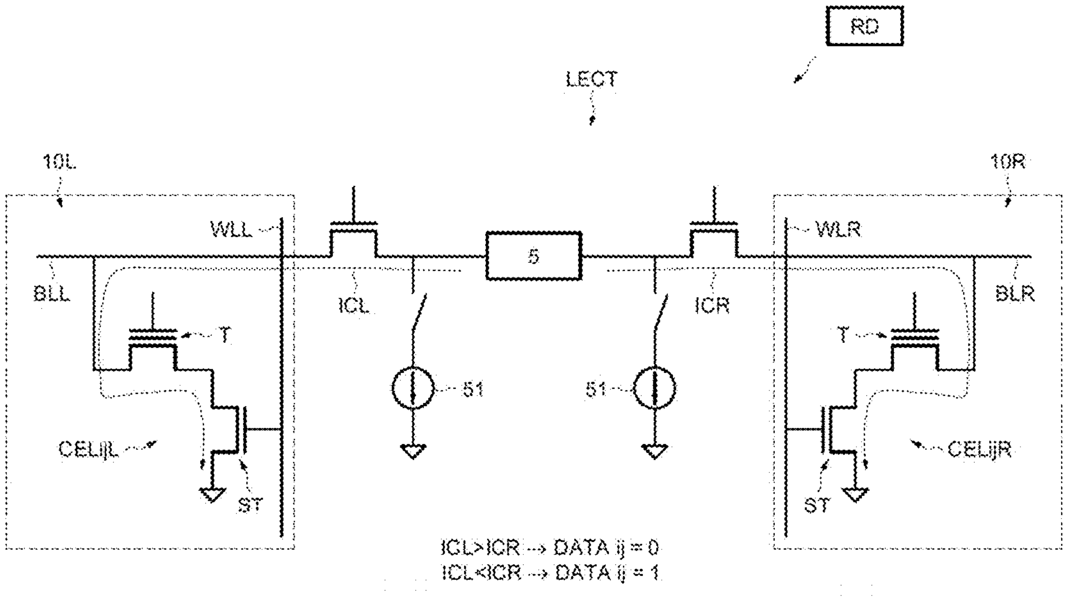

[Fig 5]
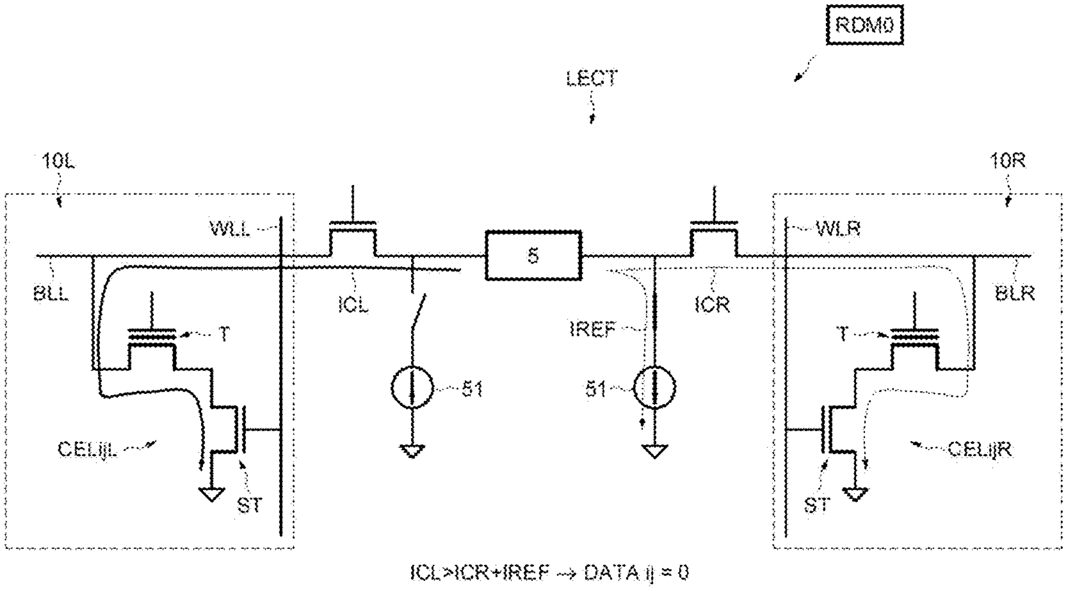

[Fig 6]
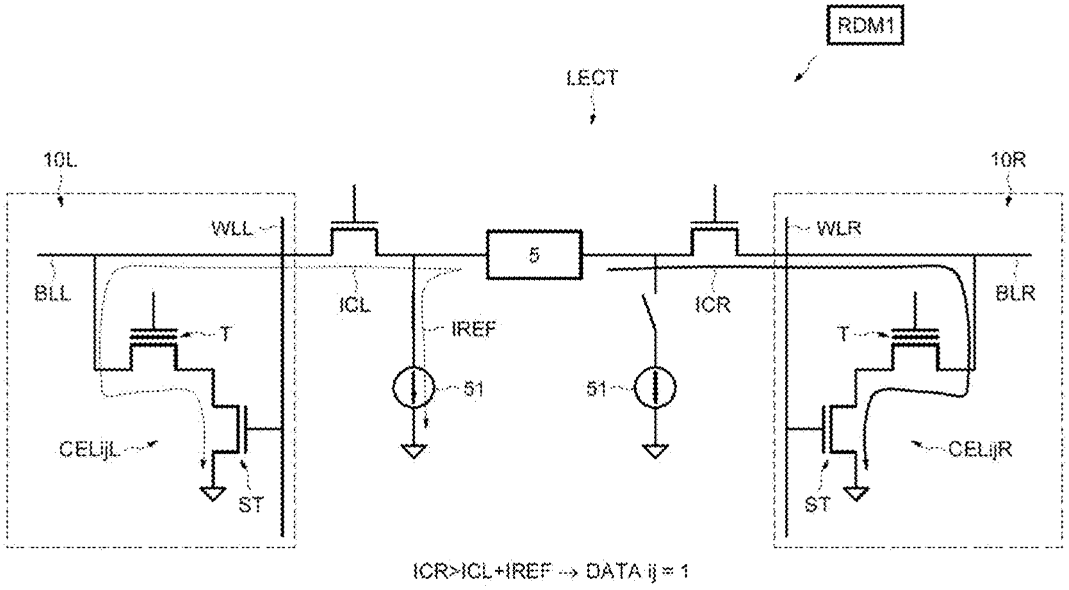

[Fig 7]
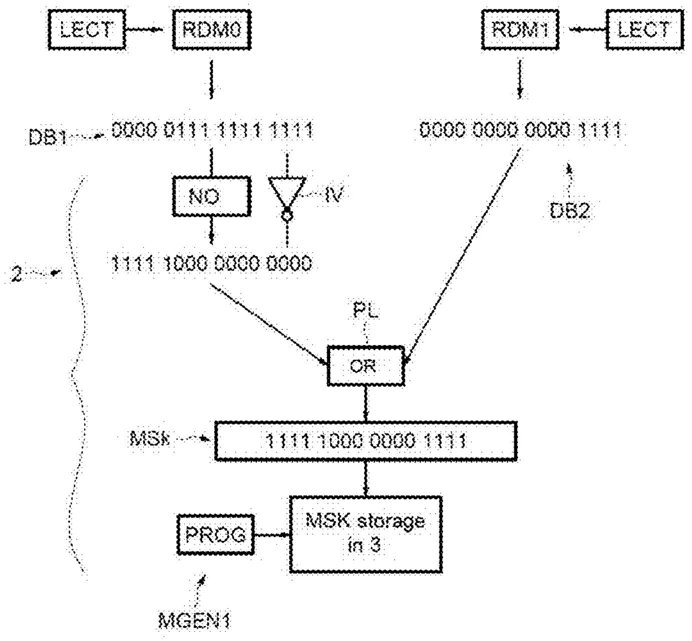

[Fig 8]
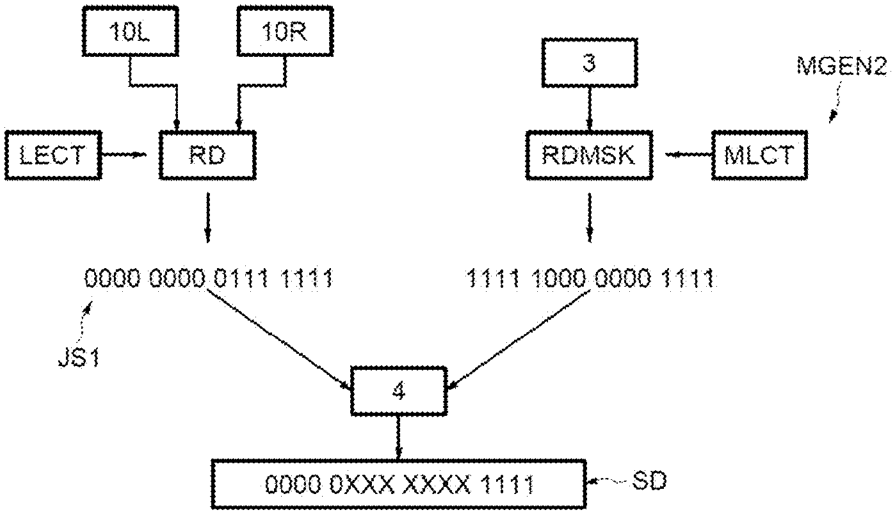
[Fig 9]
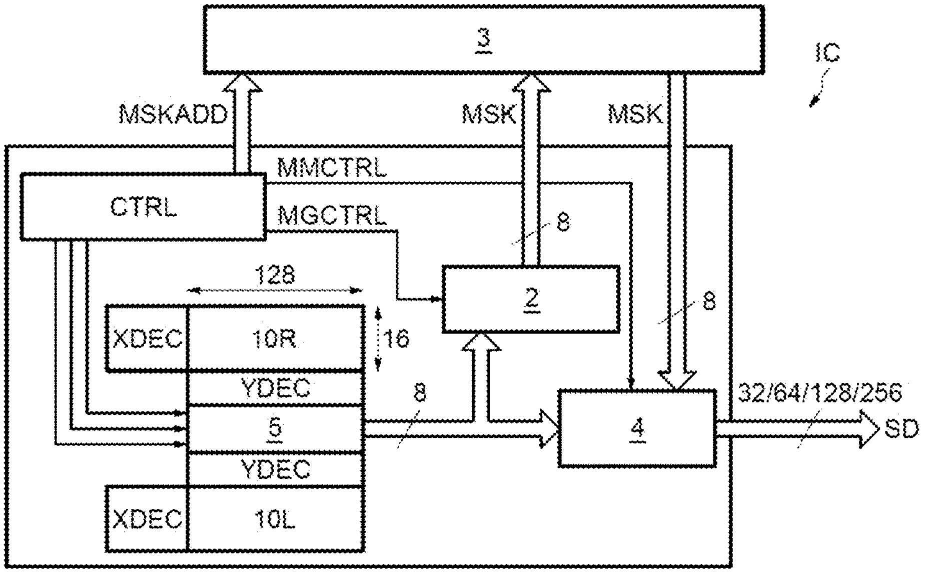

[Fig 10]
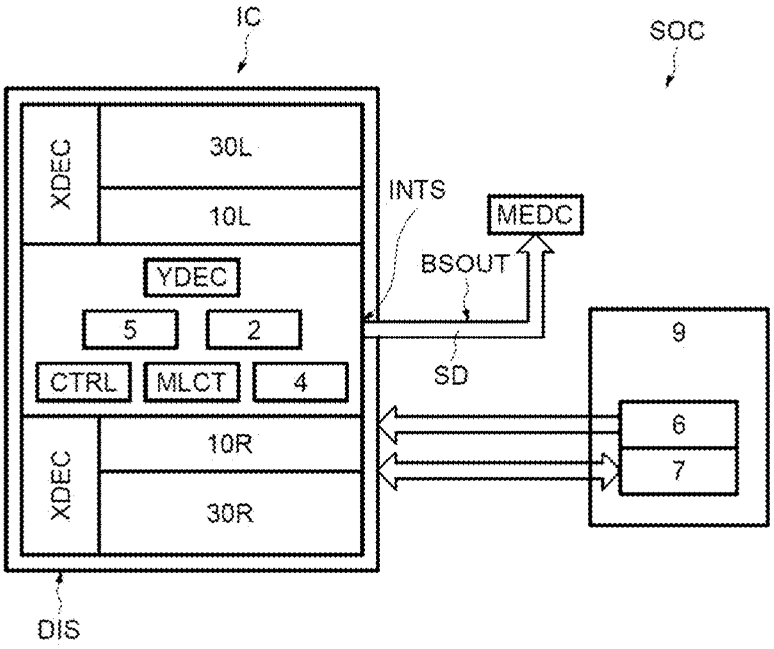

[Fig 11]
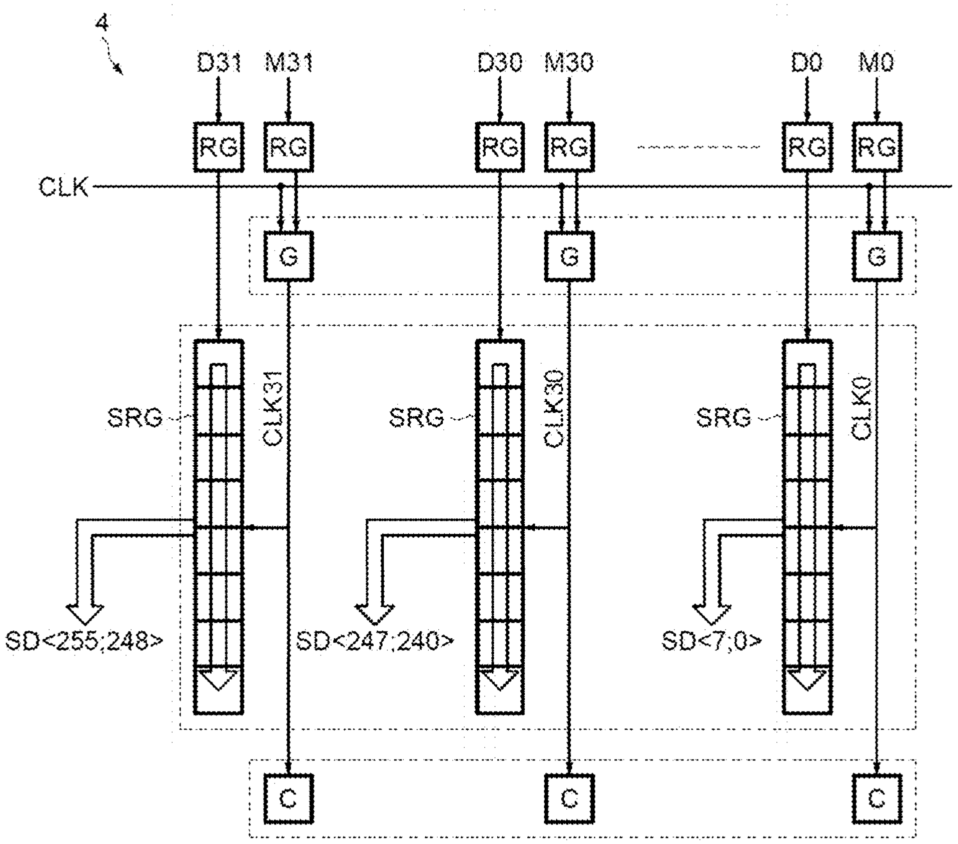

[Fig 12]
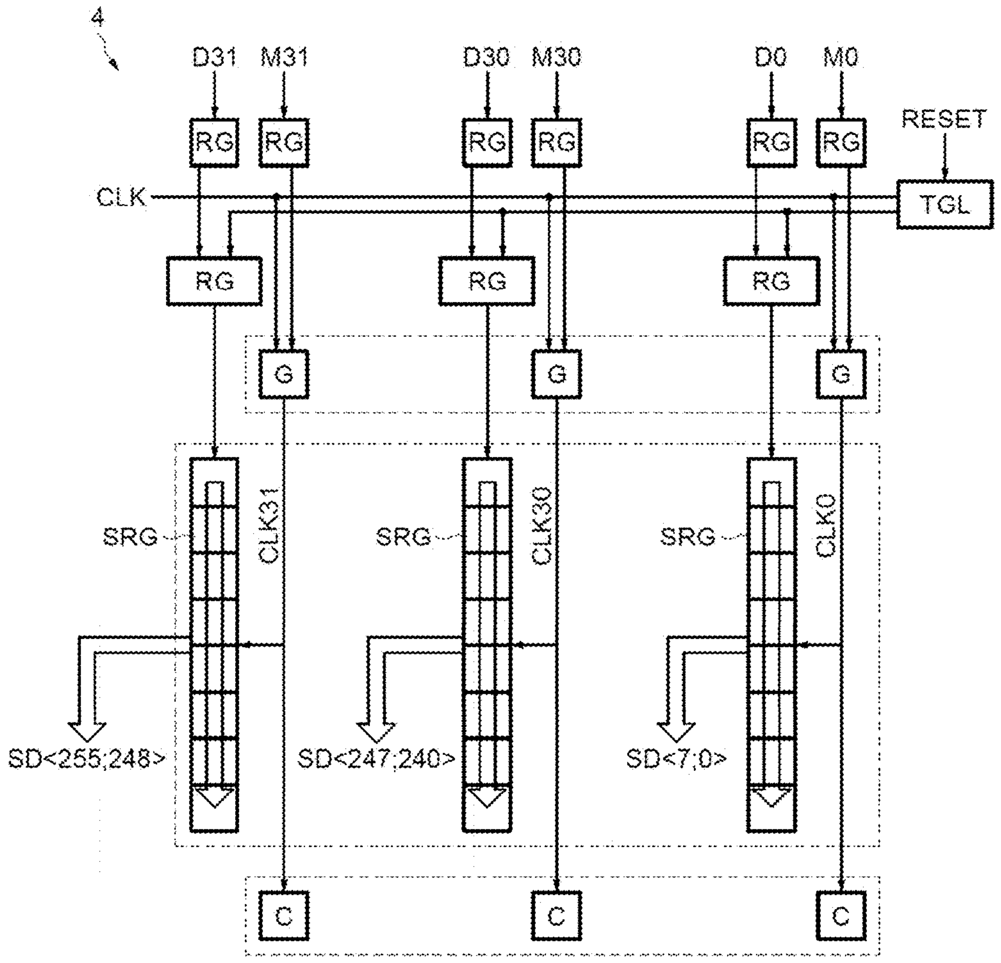

Fig [13]
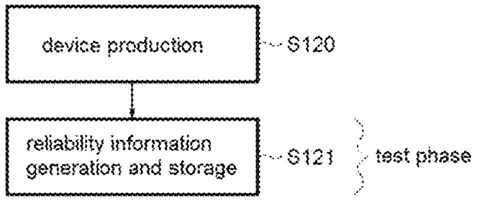
Fig [14]
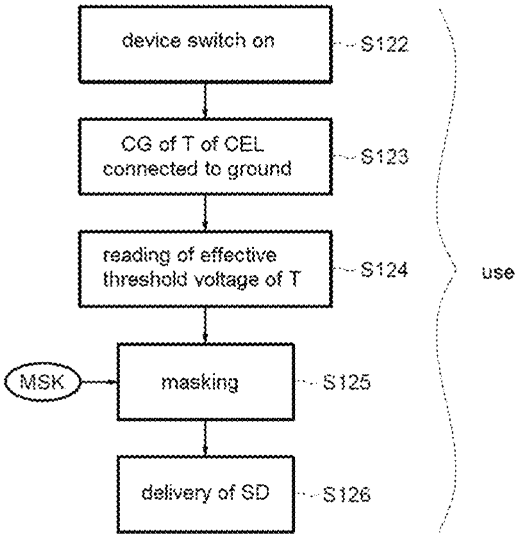

Fig [15]
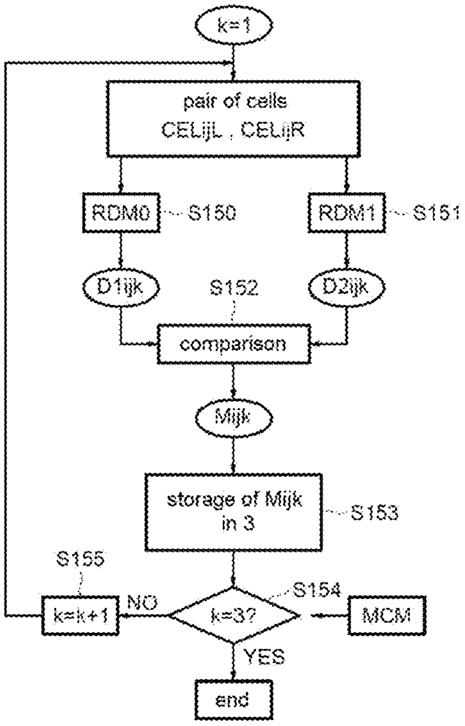
Fig [16]
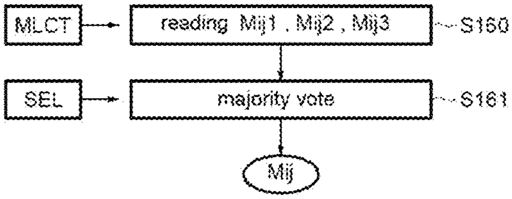

PHYSICAL UNCLONABLE FUNCTION DEVICE AND METHOD

CROSS-REFERENCE TO RELATED APPLICATIONS

This application is a continuation of U.S. patent application Ser. No. 17/199,438, filed Mar. 12, 2021, now U.S. Pat. No. 12,001,593 issued Jun. 4, 2024, which claims the benefit of French Application No. 2002929, filed on Mar. 25, 2020, which applications are hereby incorporated herein by reference.

TECHNICAL FIELD

Embodiment devices and methods concern physical unclonable functions (PUFs), and in particular those carried out within an integrated circuit.

BACKGROUND

A physical unclonable function automatically generates a unique non-predictable code which depends on random or partially random physical characteristics of the physical unclonable function. These physical characteristics can be caused by variations during the manufacture of the physical unclonable function.

Hence, the cloning of such a function is very difficult or even impossible.

Furthermore, the content of the generated code, which is unique, because it differs from one physical unclonable function to another physical unclonable function, cannot be predicted and may depend, for example, on a particular configuration of components during switching on of the function. Hence, for example, a physical unclonable function can be produced by a non-volatile memory which has a content during the switching on which depends on partially random physical characteristics of the memory, these manufacturing variations leading to different physical characteristics for different memories.

SUMMARY

On the one hand, it is desirable that the physical unclonable functions are sufficiently robust in order to be invariable, in particular over time, following repeated uses, and in the case of temperature variations.

On the other hand, it is desirable that the random variations of the physical characteristics are easily identifiable in order to unequivocally distinguish different data.

In addition, it is desirable that the embodiments of the physical unclonable functions require few or no dedicated manufacturing steps.

The unique non-predictable codes typically include a series of random data and are mainly used as encryption keys. These data are typically secret.

It is possible to produce physical unclonable functions using, for example, random access or non-volatile memories, or even ring oscillators or even specific logic circuits.

However, these prior art devices can, in certain cases, be more or less easily detectable within the integrated circuit or else be not very robust with respect to temperature changes or ageing or even be sensitive to attacks by fault injection, or even have a penalizing surface footprint.

There is therefore a need for physical unclonable function structures that are robust with respect to external variations and/or ageing, the data of which can be clearly discriminated on reading, while being difficult to extract by third-party attacks. It would also be advantageous for the structures to be easy to produce using existing technologies and have a surface footprint that is not penalizing.

According to one aspect, a system is proposed comprising a physical unclonable function device, this device comprising:

a first assembly of non-volatile memory cells each having a selection transistor embedded in a semiconductor substrate and a depletion-type state transistor having a control gate and a floating gate that are electrically connected, the state transistors having respective effective threshold voltages belonging to a common random distribution, and a processing circuit configured to deliver, to an output interface of the device, a group of output data based on a reading of the effective threshold voltages of the state transistors of the memory cells of the first assembly.

The group of output data is typically a unique non-predictable code formed of a series of random data which can advantageously be used as encryption/decryption keys.

This type of non-volatile memory cells with embedded selection transistor is a particularly compact structure. It has been described in detail in patent application US 2013/0 228 846.

However, in the present case, in comparison with conventional cells, the state transistors of the memory cells of the first assembly are of the depletion type and have a control gate and a floating gate that are electrically connected.

These features are particularly advantageous because it is then possible to read a memory cell of the first assembly by applying a zero voltage on the control gate, for example by connecting this control gate to ground, because the state transistor is normally on.

In addition, since during reading there is a zero voltage on the control gate, no stress is induced during reading ("read stress") in the gate dielectric, which makes it possible to strongly reduce, or even remove, the risk of the appearance of a phenomenon known to a person skilled in the art as "read disturb" which can be manifest by a change in the logic value of the stored bit.

Furthermore, the state transistor being of depletion type, the "normally on" nature of the state transistor when the memory cell is, for example, in a blank state and a zero voltage is applied on the control gate, is linked to the value of the threshold voltage in the blank state and this memory cell, which can for example be chosen to be negative or substantially zero.

By way of indication, this threshold voltage can be of order −1 volts.

The state transistors of all the memory cells have the same theoretical threshold voltage. However, these are effective threshold voltages; in other words, the actual value of the threshold voltages, which vary slightly following the random dispersion, for example due to random physical factors in manufacture.

Moreover, these cells offer a very large dispersion of effective threshold voltages.

The dispersion of effective threshold voltages obtained is for example equal to −1 volts plus or minus 100%.

Moreover, the common random distribution is advantageously a distribution of effective threshold voltages of state transistors, with floating and command gates connected, of blank memory cells having never been written to.

According to an embodiment, each memory cell includes a gate oxide disposed between the floating gate of the state transistor and the substrate, the thickness of this gate oxide being greater than 8 nanometers, for example between 8 and 10 nanometers.

Such a thick gate oxide makes it possible to obtain a good robustness of the physical unclonable function device in terms of ageing.

According to an embodiment, the processing circuit includes a reading circuit configured to carry out the reading of the effective threshold voltages of the state transistors, and the first assembly of non-volatile memory cells is organized into two first matrix sub-assemblies disposed symmetrically with respect to the reading circuit, all the lines or rows of the two first matrix sub-assemblies being parallel.

Furthermore, the reading circuit is configured to carry out the reading, which includes differential readings of the effective threshold voltages of the state transistors of the pairs of symmetric memory cells located respectively in the two first sub-assemblies on the homologous columns of these first two sub-assemblies.

Two homologous columns of the first two sub-assemblies are understood to be columns having the same column address.

The distribution of the first assembly into two symmetric matrix sub-assemblies associated with the differential approach at the reading level, is particularly advantageous in the sense that it enables the dispersion to be increased within the common random distribution of effective threshold voltages of the state transistors.

In addition, it is particularly preferable to ensure the reliability of the memory cells of the first assembly so as to retain, for the delivery of the group of output data, only the pairs of memories cells for which the content is reliable, in other words not liable to vary from one switching on to another.

Also, according to an embodiment, the processing circuit advantageously includes a second assembly of memory cells each having a selection transistor embedded in a semiconductor substrate and a state transistor, having a control gate and a floating gate, the memory cells of the second assembly being intended to contain reliability information representative of the reliability or unreliability of the contents of the pairs of memory cells of the first assembly.

Unlike the memory cells of the first assembly, the memory cells of the second assembly, which are intended to contain reliability information, do not include state transistors having their floating gate and their control gate electrically connected. However, these state transistors are also advantageously of the depletion type.

Thus, just as it is possible (as indicated above) to read a memory cell of the first assembly by applying a zero voltage on the control gate, for example by connecting this control gate to ground, because the state transistor is normally on, it is also possible to read a memory cell of the second assembly by applying a zero voltage on the control gate, because the state transistor of such a cell is also advantageously normally on.

In other words, the memory cells of the second assembly are conventional memory cells with state transistor and embedded selection transistor, for example of the type of cells described in the above cited United States patent application but with, for example, an implant of arsenic in the region of the channel so as to obtain depletion-type state transistors.

According to an embodiment, the second assembly includes a matrix arrangement of memory cells sharing the same columns as those of the matrix arrangement of memory cells of the first assembly.

This facilitates the decoding, since the first assembly and the second assembly share the same decoding column.

Furthermore, it is also advantageous that the second assembly likewise includes two second sub-assemblies respectively distributed on either side of the first sub-assemblies.

Furthermore, the reliability information associated with the pairs of memory cells is stored in memory cells of the second assembly located on the same column as those on which the corresponding pairs of memory cells of the first assembly are located.

Such a symmetric storage of reliability information on either side of the first sub-assemblies enables easier reading.

According to an embodiment, the processing circuit includes a first generating circuit configured to generate the reliability information taking into account a margin value on the differential readers of the effective threshold voltages of the state transistors of the pairs of memory cells.

More precisely, and according to a first possible variant, the first generating circuit comprises:

- the reading circuit mentioned above, configured to also carry out, for each pair of memory cells of the first assembly,
  - a first reading of the difference between, on the one hand, the current flowing via a first memory cell of the pair increased by a reference current representative of the margin value and, on the other hand, the current flowing via the second memory cell of the pair, so as to obtain a first binary datum,
  - a second reading of the difference between, on the one hand, the current flowing via the second memory cell increased by the reference current and, on the other hand, the current flowing via the first cell, so as to obtain a second binary datum,
    - a comparison circuit configured to compare one of the first and second binary data with the inverse of the other of the first and second binary data and to deliver the reliability information associated with the pair of memory cells, the logic value of which depends on the result of the comparison, and
    - a writing circuit for writing the reliability information in the corresponding memory cell of the second assembly.

Although in this variant a single piece of reliability information is stored for a pair of memory cells of the first assembly, it is possible, in another variant, to store an odd number of pieces of reliability information termed "provisional," then to select the actual piece of reliability information by majority vote on the provisional reliability information.

More particularly, according to this other variant, the first generating circuit comprises

- the reading circuit configured to carry out, for each pair of memory cells of the first assembly,
  - a) a first reading of the difference between, on the one hand, the current flowing via a first memory cell of the pair increased by a reference current representative of the margin value and, on the other hand, the current flowing via the second memory cell of the pair, so as to obtain a first binary datum,
  - b) a second reading of the difference between the current flowing via the second memory cell increased by the reference current and, on the other hand, the current flowing via the first cell, so as to obtain a second binary datum, a comparison circuit configured to c) compare one of the first and second binary data with the inverse of the other of the first and second binary data and d) to deliver a piece of provisional reliability information associated with the pair of memory cells, the logic value of which depends on the result of the comparison, a writing circuit configured for e) writing the piece of provisional reliability information in the corresponding memory cell of the second assembly, and a control circuit configured to execute, an odd number of times, by means of reading, comparing and writing, the steps a), b), c), d) and e) so as to obtain an odd number of pieces of provisional stored reliability information, and a selection circuit configured to carry out a majority vote on the logic values of the provisional reliability information, so as to select the reliability information.

According to an embodiment, the processing circuit comprises a second generating circuit configured to generate the group of output data at least from the differential readings of the effective threshold voltages of the state transistors of the pairs of memory cells, and the reliability information of these pairs of memory cells.

Although the embodiments mentioned above provide a satisfactory solution to the stated problem, it is possible, in certain cases, that asymmetry factors of the structure can affect the random nature of the output data group delivered by the physical unclonable function device.

Also, advantageously, the second generating circuit is configured to generate the output data group not only from differential readings of the effective threshold voltages of the state transistors of the pairs of memory cells and the reliability information of these pairs memory cells, but also from the addresses of the columns in which the pairs of memory cells are located.

Moreover, according to another embodiment, it is possible for example to use the low-weight bit of the address of the column in which the pair of memory cells is located.

More precisely, the two generating circuits can thus include the reading circuit configured to carry out, for each pair of memory cells, the differential reading so as to obtain a first piece of binary information having a first logic value, an inversion circuit configured to invert or not the first logic value as a function of the logic value of the low-weight bit of the address of the column in which the pair is located and to deliver a second piece of binary information having a second logic value, and a masking circuit configured to retain the second piece of binary information as output data, only if the pair of memory cells is associated with a piece of reliability information designating it as reliable.

It is furthermore particularly advantageous that the first assembly of memory cells, the second assembly of memory cells and the processing circuit is located within a same integrated circuit.

Specifically, this introduces a high level of protection against intrusive physical analyses.

More precisely, if an attacker carries out an attack on the rear face of the integrated circuit in order to get as close as possible to the state transistors, he will destroy the vertical transistors and consequently will not be able to perform a reading of the state transistors of the memory cells of the first assembly.

The system can form a system-on-chip further comprising the same integrated circuit, a coding/decoding circuit configured to use the group of output data as encryption/decryption key, a control circuit configured to deliver, to the same integrated circuit, control logic signals and analog voltage signals, as well as another non-volatile memory.

It should be noted that, in this case, there is no exchange of binary data between the integrated circuit containing the physical unclonable function device and this other non-volatile memory.

The only data emanating from the integrated circuit containing the physical unclonable function device are output data but they are extremely difficult, or even impossible, to determine for an attack, since they preferably circulate on a bus of a plurality of wires, for example 256 wires, at the same time and on different metal levels.

According to another aspect, a method is proposed for automatically generating a unique non-predictable code at the output interface of a physical unclonable function device belonging to a system such as defined above, the method comprising switching on the device and reading the effective threshold voltages of the state transistors of the memory cells of the first assembly, the control gates of the state transistors of these memory cells being connected to ground during the reading.

According to another aspect, a method is proposed for producing an unclonable function device such as defined above, comprising producing the device within an integrated circuit and generating and storing reliability information, for example during a test phase (known to a person skilled in the art by the acronym "EWS") of the integrated circuit.

BRIEF DESCRIPTION OF THE DRAWINGS

Other advantages and features of the invention shall become evident from the detailed description of embodiments and implementations of the invention, that are in no way limiting, and from the enclosed drawings in which:

FIG. 1 illustrates a physical unclonable function device;

FIG. 2 illustrates the structure of a non-volatile memory cell;

FIG. 3 illustrates an assembly of non-volatile memory cells is organized in two matrix sub-assemblies;

FIG. 4 illustrates a differential reading carried out by a reading circuit incorporating sense amplifiers;

FIG. 5 illustrates a differential reading taking account a margin value;

FIG. 6 illustrates another differential reading carried out by the reading circuit and taking acc2024-04-23ount the margin value;

FIG. 7 illustrates a first generating circuit enabling generation of reliability information of a mask;

FIG. 8 illustrates a second generating circuit configured to generate a group of output data;

FIG. 9 illustrates an integrated circuit including a physical unclonable function device;

FIG. 10 illustrates another integrated circuit including a physical unclonable function device;

FIG. 11 illustrates a masking circuit;

FIG. 12 illustrates another masking circuit;

FIG. 13. illustrates a method for generating and storing reliability information;

FIG. 14. illustrates a method for automatic generation of a non-predictable unique code;

FIG. 15. illustrates a method for storing, for each datum, provisional reliability information; and FIG. 16. illustrates a method for carrying out a majority vote on the provisional reliability information in order to determine the reliability information.

DETAILED DESCRIPTION OF ILLUSTRATIVE EMBODIMENTS

In FIG. 1, the reference DIS designates a physical unclonable function device.

This device DIS comprises a first assembly 1 of non-volatile memory cells CEL the structure of which will be returned to in more detail below.

The device DIS also includes processing circuit MT configured to deliver, to an output interface INTS, a group of output data SD based on a reading of the effective threshold voltages of the state transistors of the memory cells CEL of the first assembly 1.

Before returning in more detail to the other elements of the processing circuit MT, reference is now made more particularly to FIG. 2 in order to describe the structure of a non-volatile memory cell CEL of the first assembly.

The cell CEL includes a state transistor T having a command gate or control gate CG and a floating gate FG. The two gates CG and FG are electrically connected in this case, for example by means of a via or contact which is not located in the plane of FIG. 2 but which is schematically represented by two dashed lines.

The floating gate FG is separated from the semiconductor substrate SUB by a gate oxide OX the thickness of which is advantageously greater than 8 nanometers, for example between 8 and 10 nanometers.

The drain D of the state transistor T is connected to a line of bits by means of a contact CBL.

The control gate CG of the transistor T is connected to a gate control line.

The channel of the state transistor with floating gate, including an implanted surface zone CH, is connected to a source line SL by means of a selection transistor ST embedded in the substrate SUB.

The transistor ST has a vertical selection gate embedded in the substrate, the source line SL also being embedded.

The drain D of the selection transistor ST and the source S of the state transistor T form a common semiconductor region.

As indicated above, the channel of the state transistor T includes a channel implanted at the surface CH, for example N-doped, so that the corresponding memory cell operates in a depletion mode.

In other words, the state transistor T being of depletion type, the normally on nature of the state transistor when the memory cell is in a blank state and a zero voltage is applied on the control gate, is linked to the value of the threshold voltage in the blank state of the memory cell, which can be chosen to be negative or substantially zero.

In the case of an N-conductivity channel, the implanted dopants can be, for example, arsenic As and the concentration of dopants determines the threshold voltage of the transistor T of a memory cell in the blank state.

Here, the state transistor is configured to have such a negative threshold voltage.

The dose of implanted dopants could be adjusted so as to obtain a negative theoretical threshold voltage, for example of order −1 volts.

All the state transistors of all the cells CEL of the first assembly are intended to have the same threshold voltage.

These are effective threshold voltages; in other words, the actual values of the threshold voltages vary slightly following a random dispersion, for example due to random physical factors in manufacture. This type of dispersion is usual and known per se.

The control and floating gates of the state transistors being electrically connected, the state transistors have by nature a variability due to these random physical factors that is more significant, and thus a larger distribution than other types of electronic components, for example MOS transistors or resistors.

Hence, the transistors T of the cells CEL of the first assembly 1 each have an effective threshold voltage belonging to a common random distribution.

In particular, the common random distribution can be a distribution of threshold voltages of memory cell transistors in the blank state, having never been written to.

Referring again to FIG. 1, it can be seen that the processing circuit MT includes a second assembly 3 of memory cells CELM each also having a selection transistor embedded in a semiconductor substrate and a state transistor having a control gate and a floating gate.

Indeed, the memory cells CELM are analogous to the memory cells CEL, except that the floating gates and the control gates of the state transistors are not electrically connected. Each state transistor of a cell CELM is also advantageously a transistor operating in a depletion mode.

Such memory cells CELM are for example of the type of cells described in more detail in patent application US 2013/0 228 846 and having in addition, for example, an implant of arsenic in the channel region as described above for a memory cell CEL of the first assembly.

As will be seen in more detail below, these memory cells CELM are intended to store reliability information representative of the reliability or unreliability of the contents of the memory cells CEL of the first assembly.

Moreover, the processing circuit MT includes first generating circuit MGEN1 configured to generate the reliability information.

The processing circuit MT also includes a second generating circuit MGEN2 configured to generate the group of output data SD at least from the readings of the effective threshold voltages of the state transistors of the pairs of memory cells CEL, and the reliability information contained in these memory cells CELM of the second assembly 3.

We will come back in detail to an example of the structure of the operation of the first generating circuit MGEN1, of the second generation MGEN2 and of the matrix arrangement of the second assembly of cells 3.

Referring now, more particularly, to FIG. 3, it can be seen that in this advantageous embodiment, the first assembly 1 of non-volatile memory cells CEL is organized in two first matrix sub-assemblies 10L and 10R symmetrically disposed with respect to the reading circuit LECT of conventional structure and known per se, typically including "sense amplifiers" 5.

All the lines or rows of the two first matrix sub-assemblies 10L and 10R are parallel.

The line decoding of each of these two sub-assemblies 10L, 10R is carried out by line decoders XDEC of conventional structure that is known per se, while the decoding columns of these two first sub-assemblies is carried out by two column decoders YDEC, also of conventional structure and known per se, disposed symmetrically with respect to the sense amplifiers 5.

Moreover, the reading circuit LECT is configured to carry out differential readings of the effective threshold voltages of the state transistors of the pairs of symmetric memory cells CELijL and CELijR or CELmpL and CELmpR located respectively in the two first sub-assemblies 10L and 10R on the homologous columns of these first two sub-assemblies.

Moreover, these memory cells of the second assembly 3 are intended to contain reliability information representative of the reliability or unreliability of the contents of the pairs of memory cells of the first assembly.

Here, this reliability information is binary data having a first logic value, for example the logic value 0, representative of an unreliability of the contents of a given pair of memory cells of the first assembly, or a second logic value, for example logic value 1, representative of a reliability of the contents of a given pair of memory cells of the first assembly.

Hence, by way of example, in FIG. 3, the reliability information Mij, having here the logic value 0, is representative of the unreliability of the contents bijL and bijR of pair of memory cells CELijL and CELijR of the first assembly.

By contrast, the reliability information Mmp which has logic value 1, is here representative of the reliability of the contents bmpL and bmpR of pair of memory cells CELmpL and CELmpR of the first assembly.

All of this reliability information forms a mask MSK.

Reference is now made more particularly to FIG. 4, in order to describe a differential reading RD carried out by the reading circuit LECT incorporating the sense amplifiers 5.

In the example illustrated in FIG. 4, the reading circuit LECT is configured to measure the difference between the effective threshold voltages of the pair of state transistors T respectively to the two memory cells CELijL and CELijR.

The reading circuit is coupled to the transistors T via the respective lines of bits BLL and BLR.

The selection transistors ST are controlled on their gate by signals carried on the respective word lines WLL and WLR.

In addition to the sense amplifiers 5, the reading circuit includes reference current generators 51 which can be connected or not to the sense amplifiers 5 by means of switches.

In the context of a differential reading RD such as illustrated in FIG. 4, advantageously carried out with the control gates of the state transistors connected to ground, the reference current generators are not connected to the sense amplifiers 5.

The sense amplifier 5 is configured to amplify a difference between the current ICL flowing in the cell CELijL and the current ICR flowing in the cell CELijR.

The reading currents ICL and ICR being representative of the effective threshold voltages of the transistors with floating gate of the respective cells CELijL and CELijR, the difference of these currents is representative of the difference between the effective threshold voltages of these state transistors.

Hence, the reading circuit LECT is capable of measuring the difference between the effective threshold voltages of the pairs of state transistors of two cells disposed on homologous lines of bits.

Moreover, by way of non-limiting example, it can be decided that if the current ICL is greater than the current ICR, then the data DATAij contained in this pair of cells has a logic value 0, whereas if the current ICL is a less than the current ICR, then this datum has a logic value 1.

Of course, the inverse convention could have been adopted.

Reference is now made more particularly to FIGS. 5 and 6, in order to describe the differential readings of the effective threshold voltages of the state transistors of the pairs of memory cells taking account of a margin value.

Here too, these differential readings are advantageously carried out with the control gates of the state transistors connected to ground.

FIG. 5 shows a first differential reading RDM0 taking account of a margin value.

More precisely, during this reading RDM0, the additional current IREF generated by one of the current generators 51 is added to the current flowing via cell CELijR.

This makes it possible to measure a difference between the effective threshold voltages from a certain margin.

The value of the margin corresponds to the current IREF representative of a reference voltage deviation.

This margin value is chosen, in particular, depending on the precision of the reading circuit LECT.

By way of indication, the value of the current IREF can be equal to 2 microamperes.

Further, in this case, if the current ICL is greater than the sum of the current ICR and of the current IREF, then the stored data DATAij is taken as equal to 0, for example.

FIG. 6 shows another differential reading RDM1, carried out by the reading circuit LECT and taking account of the margin value.

More precisely, in this case, the reference current IREF is added to the current ICL flowing in the cell CELijL.

Further, for example, if the current ICR is greater than the sum of the current ICL and of the current IREF, then DATAij is equal to 1.

Reference is now made more particularly to FIG. 7, in order to describe an example of a structure of the first generating circuit MGEN1 enabling generation of the reliability information of the mask MSK.

As illustrated in FIG. 7, the reliability information is generated by taking into account a margin value on the differential readings RDM0 and RDM1 of the effective threshold voltages of the state transistors of the pairs of memory cells.

More precisely, the first generating circuit MGEN1 includes a reading circuit LECT configured to carry out, for each pair of memory cells of the first assembly 1, a first reading, for example the reading RDM0, of the difference between on the one hand the current flowing in a first memory cell of the pair increased by the reference current representative of the margin value and, on the other hand, the current flowing in the second memory cell of the pair, so as to obtain a first binary datum.

The reading circuit LECT is also configured to carry out a second reading for example of the reading RDM1, of the difference between, on the one hand, the current flowing via the second memory cell increased by the reference current and, on the other hand, the current flowing via the first memory cell, so as to obtain a second binary datum.

In the example described here, for the purposes of simplification, a group of 16 first binary data DB1, for example [0000 0111 1111 1111], obtained at the end of the first reading RDM0 and a corresponding group of 16 second binary data DB2, for example [0000 0000 0000 1111], obtained at the end of the reading RDM1 are represented.

The generating circuit MGEN1 also includes a module, globally referenced by the reference 2, configured to generate and write the mask MSK in the second assembly 3 of memory cells.

This module 2 includes an inverter IV for inverting one of the groups of binary data, for example the group of first binary data DB1 originating from the reading RDM0, so as to obtain, in the case illustrated, the group [1111 1000 0000 0000].

Then, a comparison circuit, for example an OR gate referenced PL, allows a bit by bit comparison of the group of second binary data DB2 from the reading RDM1 with the inverse of the group of first binary data DB1 originating from the reading RDM0.

If an inverted bit effectively has a logic value opposite to that of the corresponding non-inverted bit, then the data can be considered reliable and a 1 can be assigned to the corresponding reliability information, which is obtained by the logic OR gate.

By contrast, if the logic value of the inverted bit is equal to the logic value of the corresponding non-inverted bit, then the data is considered unreliable and the corresponding reliability information will have logic value 0.

A mask MSK is thus obtained including as many bits as there are pairs of memory cells in the first assembly 1. In the illustrated case, the mask MSK is equal to [1111 1000 0000 1111].

Of course, it would be possible to replace the inverter and the OR gate by an EXCLUSIVE OR (XOR) logic gate.

Module 2 also includes a writing circuit PROG, having known conventional structure, for writing reliability information (bits) of the mask MSK in the corresponding memory cells of the second assembly 3.

Reference is now made more particularly to FIG. 8, in order to describe the example of the structure of the second generating circuit MGEN2 configured to generate the group of output data at least from the differential readings of the effective threshold voltages of the state transistors of the pairs of memory cells, and the reliability information of these pairs of memory cells.

More precisely, the reading circuit LECT has a conventional differential reader RD of the pairs of homologous memory cells respectively located in the two sub-assemblies 10L and 10R so as to obtain a first set of output data JS1, for example [0000 0000 0111 1111], including in this simplified example 16 output binary data.

This reading is advantageously carried out with the control gates of the state transistors connected to ground.

Conventional reading circuit MLCT also including sense amplifiers such as the sense amplifiers 5, carries out a conventional reading RDMSK of the reliability information MSK corresponding to the pairs of cells read and contained in the memory cells CELM of the second assembly 3, for example [1111 1000 0000 1111].

This reading RDMSK is also advantageously carried out with the control gates of the state transistors connected to ground.

The second generating circuit MGEN2 then includes the masking circuit 4 configured to retain as output data SD only the binary data of the set JS1 which are assigned a piece of reliability information signifying that the data is reliable, in this case a piece of reliability information equal to 1.

In the present case, the data considered reliable (value 1) are the first five bits on the left and the four last bits, the other bits being uncertain (X).

Consequently as shown in FIG. 8 by way of example, the set of output data SD will include only 9 bits from the 16 of the set JS1 [0000 0XXX XXXX 1111].

Reference is now made more particularly to FIG. 9, which schematically illustrates an integrated circuit IC including various means of the physical unclonable function device described above.

More precisely, here there are two sub-assemblies 10L and 10R of memory cells each including 16 lines and 128 columns.

Line decoders XDEC are assigned to each of these two sub-assemblies as well as column decoders YDEC distributed on either side of the sense amplifiers 5.

A controller CTRL controls the operation of the module 2 for generating and storing the mask MSK as well as the operation of the masking circuit 4 using control signals MGCTRL and MMCTRL.

The data are extracted from two sub-assemblies 10R and 10L for example per block of 8 bits and the mask MSK is stored in the second assembly 3 of cells per block of 8 bits under the control of control signals MSKADD.

Similarly, the reliability information of the mask is extracted from blocks of 8 bits.

The output data SD can be data on 32, 64, 128 or 256 bits, as desired.

Although the embodiment illustrated in FIG. 9 is conceivable, it is particularly preferable to provide an embodiment of the type illustrated in FIG. 10.

More precisely, according to this embodiment, the second assembly 3 of memory cells which is intended to store the reliability information, includes two sub-assemblies 30L and 30R respectively distributed on either side of the first sub-assemblies 10L and 10R.

Furthermore, the reliability information associated with the pairs of memory cells is stored in memory cells of the second assembly located on the same columns as those on which the corresponding pairs of memory cells are located.

Furthermore, the first assembly 1 of memory cells including the two sub-assemblies 10L and 10R, the second assembly 3 of memory cells including the two sub-assemblies 30L and 30R as well as the processing circuit MT are located within the same integrated circuit IC.

This simplifies the column decoding and makes more difficult an extraction of data by an attack, for example on the rear face of the device DIS.

In addition, the integrated circuit IC incorporating the device DIS is advantageously located on a system-on-chip SOC further including

- a bus BSOUT connected to the output interface INTS, preferably distributed over a plurality of metal levels, and intended to transport the output data SD,
- a coding/decoding circuit MEDC configured to use the group of output data SD as an encryption/decryption key,
- a control circuit 6 and 7, configured to deliver, to the integrated circuit IC, control logic signals and analog voltage signals in particular, and
- another non-volatile memory 9.

It should be noted here in this respect that there is no data exchanged between the non-volatile memory plane 10L, 10R, 30L and 30R and the memory plane of the non-volatile memory 9.

Reference is now made more particularly to FIGS. 11 and 12, in order to illustrate possible embodiments of the masking circuit 4.

In FIG. 11, it can be seen that the masking circuit includes registers RG intended to contain data D and reliability information M respectively extracted from the first and second assemblies of memory cells.

In the example described here, 32 pairs of registers are provided in order to store, in parallel, 32 items of data D extracted from the first assembly of memory cells and 32 reliability information M extracted from the second assembly of memory cells Furthermore, a logic circuit G, for example an AND gate, is associated with each register RG intended to store a piece of reliability information M and is intended to cut or not cut a clock signal CLK ("clock gating").

More precisely, if the reliability information has the value 0, which corresponds to an unreliability of the corresponding data D, then the clock signal is not transmitted as output from the gate G.

By contrast, if the reliability information M has the value 1, which corresponds to a reliability of the corresponding data D, then the clock signal is effectively transmitted as output from the gate G.

Here, the masking circuit 4 also includes 32 shift registers SRG each intended to receive data D at the rate of the corresponding clock signal CLK31-CLK0 delivered by the corresponding gate G.

In other words, when the corresponding clock signal is effectively delivered at the output of the gate G, the corresponding data D can be stored in the shift register.

Moreover, each time that the clock signal CLK is delivered at the output of the gate G, there is a shift of data and storage of a new datum in the shift register SRG.

Also provided here are 32 counters C having a counting capacity of 8.

These counters are incremented at each leading edge of the corresponding clock signal when this is delivered by the corresponding gate G.

Further, when the counter C has reached its maximum counting value, this signifies that the corresponding shift register SRG is full and consequently the eight data that it contains can be extracted.

Although the embodiment illustrated in FIG. 11 is entirely conceivable, it may be preferable to use the embodiment of FIG. 12 for the generating module 4.

Whereas in the embodiment of FIG. 11, the output data were obtained from data D extracted from two sub-assemblies 10L and 10R, and the reliability information M, these output data are this time obtained in the embodiment of FIG. 12, also from the logic value of the low-weight bit of the column address in which the extracted data D is located, in other words the corresponding pair of memory cells CELij of the first assembly 1.

More precisely, the embodiment of FIG. 12 differs from that of FIG. 11 by the addition of a logic circuit TGL, clocked by the clock signal CLK and delivering this low-weight bit of the column address.

In addition, the EXCLUSIVE OR or XOR logic gates G receive a part of this low-weight address bit as well as the corresponding data D.

These XOR gates thus allow inverting or not of the logic value of the extracted data D as a function of the logic value of the low-weight bit of the column address.

Thus an improved random character is obtained for the output data SD.

As illustrated very schematically in FIG. 13, after producing the device DIS (step S120) within the integrated circuit, the reliability information is then generated and stored (step S121) before the actual use of the device, for example during the test phase of the integrated circuit (known to a person skilled in the art by the acronym EWS: Electrical Wafer Sorting).

With regard to the automatic generation of the non-predictable unique code SD at the output interface INTS of the device, this is carried out during the actual use of the device (FIG. 14).

It includes a switching on of the device (step S122).

The control gates of the state transistors T of the cells CEL of the first assembly 1 are connected to ground (step S123).

The reading of the effective threshold voltages of the state transistors of the pairs of cells (step S124) is then carried out.

Then, step S125 of masking these data using the mask MSK is carried out in order to deliver only the reliable data SD in step S126.

The invention is not limited to the embodiments and implementations which have been described, but embraces all variants.

Hence, in FIGS. 11 and 12, it would be possible for example to replace the counters C by locking memories looped back via an AND gate.

In addition, as illustrated schematically in FIGS. 15 and 16, it is possible for the first generating circuit MGEN1:

- to determine and store, for each datum, an odd number of pieces of reliability information which are then considered as provisional reliability information, then
- to carry out a majority vote on this provisional reliability information in order to determine the reliability information which will be used to determine whether the datum is reliable or unreliable.

More precisely, in FIG. 15, for each pair of cells CELijL and CELijR, the reading circuit LECT carries out, in steps S150 and S151, the differential readings RDM0 and RDM1 described with reference to FIGS. 5 and 6 so as to extract a first binary datum D1*ijk* (k=1) and a second binary datum D2*ijk* (k=1).

Then, as explained above, the comparison circuit PL (OR gate) performs a comparison S152 of these two binary data (one of which is inverted) so as to extract from it a first piece of provisional reliability information Mijk (k=1).

The writing circuit PROG then stores this provisional reliability information Mijk (step 153) in three corresponding memory cells of the second assembly 3.

Then, the control circuit MCM orders a repetition of the steps S150 to S153 so as to obtain an odd number k of pieces of provisional reliability information (steps S154 and S155).

In the example described here, k is equal to 3.

Thus, in the end, three pieces of reliability information Mij1, Mij2 and Mij3 are obtained.

Then, as illustrated in FIG. 16, during the generation of the output data SD, the reading circuit MLCT reads, for the extracted data of a pair of cells, the three pieces of provisional reliability information (step S160) and the selection circuit SEL carries out a majority vote (step S161) on the logic values of these three pieces of reliability information in order to deduce from them the reliability information associated with this datum, the logic value of which is the majority logic value.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system comprising:

a physical unclonable function device, the device comprising:

a first assembly of non-volatile memory cells each having a selection transistor embedded in a semiconductor substrate and a depletion-type state transistor having a control gate and a floating gate that are electrically connected, the depletion-type state transistors having respective effective threshold voltages belonging to a common random distribution; and a processing circuit configured to deliver, to an output interface of the device, a group of output data, wherein the group of output data is based on readings of the respective effective threshold voltages of the depletion-type state transistors of the non-volatile memory cells of the first assembly, and is based on corresponding reliability information corresponding with the depletion-type state transistors of the non-volatile memory cells of the first assembly, wherein the processing circuit includes:

a reading circuit configured to carry out the readings, wherein the first assembly of non-volatile memory cells is organized into two first matrix sub-assemblies disposed symmetrically with respect to the reading circuit, all rows of the two first matrix sub-assemblies being parallel, the reading circuit being configured to carry out differential readings of pairs of effective threshold voltages of the depletion-type state transistors of pairs of symmetric memory cells located respectively in the two first matrix sub-assemblies on homologous columns of the two first matrix sub-assemblies, and a second assembly of non-volatile memory cells each having a second selection transistor embedded in the semiconductor substrate and a second depletion-type state transistor having a control gate and a floating gate, the non-volatile memory cells of the second assembly configured to contain the reliability information, wherein the reliability information is representative of a reliability or unreliability of contents of the non-volatile memory cells of the first assembly.

2. The system according to claim 1, wherein each memory cell includes a gate oxide disposed between the floating gate of the depletion-type state transistor and the semiconductor substrate, a thickness of the gate oxide being greater than 8 nanometers.

3. The system according to claim 1, wherein the second assembly includes a matrix arrangement of memory cells sharing the same columns as those of the matrix arrangement of the memory cells of the first assembly.

4. The system according to claim 3, wherein the second assembly includes two second matrix sub-assemblies distributed respectively on either side of the two first matrix sub-assemblies.

5. The system according to claim 3, wherein the reliability information associated with the pairs of symmetric memory cells is stored in memory cells of the second assembly located on the same column as those on which corresponding pairs of symmetric memory cells are located.

6. The system according to claim 1, wherein the processing circuit includes a first generating circuit configured to generate the reliability information in accordance with a margin value on the differential readings of the effective threshold voltages of the depletion-type state transistors of the pairs of symmetric memory cells.

7. The system according to claim 6, wherein the first generating circuit comprises the reading circuit configured to additionally carry out, for each pair of memory cells of the first assembly:

a first reading of a difference between a current flowing via a first memory cell of the pair increased by a reference current representative of the margin value, and a current flowing via a second memory cell of the pair, so as to obtain a first binary datum; and a second reading of a difference between the current flowing via the second memory cell increased by the reference current, and the current flowing via the first memory cell, so as to obtain a second binary datum;

a comparison circuit configured to compare one of first or second binary data with an inverse of the other of the first and second binary data and to deliver the reliability information associated with the pair of memory cells, a logic value of which depends on a result of the comparison; and a writing circuit for writing the reliability information in a corresponding memory cell of the second assembly.

8. The system according to claim 6, wherein the first generating circuit comprises:

the reading circuit configured to carry out, for each pair of memory cells of the first assembly:

a first reading of a difference between a current flowing via a first memory cell of the pair increased by a reference current representative of the margin value, and a current flowing via a second memory cell of the pair, so as to obtain a first binary datum;

a second reading of a difference between the current flowing via the second memory cell increased by the reference current and, on the other hand, the current flowing via the first memory cell, so as to obtain a second binary datum;

a comparator configured to carry out:

a comparison of one of first or second binary data with an inverse of the other of the first and second binary data; and a delivery of a piece of provisional reliability information associated with the pair of memory cells, a logic value of which depends on a result of the comparison; and a writing circuit configured to:

write the piece of provisional reliability information in a corresponding memory cell of the second assembly; and a control circuit configured to cause the reading circuit to perform an odd number of the first readings and the second readings and to cause the comparator to perform an odd number of the comparisons and the deliveries so as to obtain an odd number of pieces of provisional stored reliability information; and a selection circuit configured to carry out a majority vote on the logic values of the provisional reliability information, so as to select the reliability information.

9. The system according to claim 1, wherein the processing circuit comprises a second generating circuit configured to generate the group of output data at least from the differential readings of the effective threshold voltages of the depletion-type state transistors of the pairs of symmetric memory cells, and the reliability information of the pairs of symmetric memory cells.

10. The system according to claim 9, wherein the second generating circuit is configured to generate the group of output data from the differential readings of the effective threshold voltages of the depletion-type state transistors of the pairs of symmetric memory cells, addresses of columns in which the pairs of symmetric memory cells are located and the reliability information of the pairs of symmetric memory cells.

11. The system according to claim 10, wherein the second generating circuit comprises:

the reading circuit configured to carry out, for each pair of memory cells, the differential reading so as to obtain a first piece of binary information having a first logic value;

an inversion circuit configured to invert or not the first logic value as a function of a logic value of a low-weight bit of the address of the column in which the pair is located and to deliver a second piece of binary information having a second logic value; and a masking circuit configured to retain the second piece of binary information as output data, only if the pair of memory cells is associated with a piece of reliability information designating it as reliable.

12. The system according to claim 1, wherein the first assembly of non-volatile memory cells, the second assembly of non-volatile memory cells and the processing circuit are located within the same integrated circuit.

13. The system according to claim 12, wherein the system is a system-on-chip comprising:

the same integrated circuit;

a coding/decoding circuit configured to use the group of output data as encryption/decryption key;

a control circuit configured to deliver, to the same integrated circuit, control logic signals and analog voltage signals; and another non-volatile memory.

14. The system according to claim 1, wherein the respective control gate and the respective floating gate of each second depletion-type state transistor are not electrically connected.

15. A method of operating a system, the method comprising:

reading, with a processing circuit, effective threshold voltages of depletion-type state transistors of a plurality of memory cells of a physical unclonable function device, the plurality of memory cells being arranged in a first assembly of non-volatile memory cells each having a selection transistor embedded in a semiconductor substrate and a depletion-type state transistor having a control gate and a floating gate that are electrically connected, the first assembly of non-volatile memory cells being organized into two first matrix sub-assemblies disposed symmetrically with respect to a reading circuit, all rows of the two first matrix sub-assemblies being parallel, and the reading comprises differentially reading, by the reading circuit in the processing circuit, the effective threshold voltages of the depletion-type state transistors of pairs of symmetric memory cells located respectively in the two first matrix sub-assemblies on homologous columns of the two first matrix sub-assemblies;

accessing reliability information corresponding with the depletion-type state transistors of the non-volatile memory cells of the first assembly, wherein the reliability information is representative of a reliability or unreliability of contents of the non-volatile memory cells of the first assembly;

generating, with the processing circuit, output data based on the effective threshold voltages and the reliability information, the output data being stored in a second assembly of non-volatile memory cells each having a second selection transistor embedded in the semiconductor substrate and a second depletion-type state transistor having a control gate and a floating gate, the non-volatile memory cells of the second assembly being configured to contain the reliability information; and delivering the output data to an output interface of the physical unclonable function device.

16. A method comprising:

manufacturing an integrated circuit comprising a physical unclonable function device, said manufacturing of the physical unclonable function device including:

providing a first assembly of non-volatile memory cells each having a selection transistor embedded in a semiconductor substrate and a depletion-type state transistor having a control gate and a floating gate that are electrically connected, the depletion-type state transistors having respective effective threshold voltages belonging to a common random distribution; and providing a processing circuit configured to deliver, to an output interface of the physical unclonable function device, a group of output data, wherein the group of output data is based on a reading of the respective effective threshold voltages of the depletion-type state transistors of the non-volatile memory cells of the first assembly, and is based on a corresponding group of reliability data corresponding with the depletion-type state transistors of the non-volatile memory cells of the first assembly, the processing circuit including a reading circuit configured to carry out the readings, the first assembly of non- volatile memory cells being organized into two first matrix sub-assemblies disposed symmetrically with respect to the reading circuit, all rows of the two first matrix sub-assemblies being parallel, the reading circuit being configured to carry out differential readings of pairs of effective threshold voltages of the depletion-type state transistors of pairs of symmetric memory cells located respectively in the two first matrix sub-assemblies on homologous columns of the two first matrix sub-assemblies, and a second assembly of non-volatile memory cells each having a second selection transistor embedded in the semiconductor substrate and a second depletion-type state transistor having a control gate and a floating gate, the non-volatile memory cells of the second assembly configured to contain the reliability data, wherein the reliability data is representative of a reliability or unreliability of contents of the non-volatile memory cells of the first assembly.

17. The method according to claim 16, wherein each memory cell includes a gate oxide disposed between the floating gate of the depletion-type state transistor and the semiconductor substrate, a thickness of the gate oxide being greater than 8 nanometers.

18. The method according to claim 15, wherein the respective control gate and the respective floating gate of each second depletion-type state transistor are not electrically connected.

19. The method according to claim 15, wherein the output data is generated and stored during a test phase of the physical unclonable function device.

20. The method according to claim 15, wherein the output data being stored in the second assembly of non-volatile memory cells comprises reliability information associated with the pairs of symmetric memory cells being stored in memory cells of the second assembly located on the same columns as those on which the corresponding pairs of symmetric memory cells are located.

* * * * *